(12) United States Patent
Mankame et al.

(10) Patent No.: US 9,511,540 B2
(45) Date of Patent: Dec. 6, 2016

(54) PROCESS FOR SECURING A MICRO-TRUSS STRUCTURE TO A PANEL

(71) Applicant: GM GLOBAL TECHNOLOGY OPERATIONS LLC, Detroit, MI (US)

(72) Inventors: Nilesh D. Mankame, Ann Arbor, MI (US); Jacob M. Hundley, Los Angeles, CA (US); Julien P. Mourou, Bloomfield Hills, MI (US); Steven C. Lang, Columbus, MI (US)

(73) Assignee: GM Global Technology Operations LLC, Detroit, MI (US)

(*) Notice: Subject to any disclaimer, the term of this patent is extended or adjusted under 35 U.S.C. 154(b) by 183 days.

(21) Appl. No.: 14/454,598

(22) Filed: Aug. 7, 2014

(65) Prior Publication Data
US 2016/0039193 A1 Feb. 11, 2016

(51) Int. Cl.
| | |
|---|---|
| *B60R 13/02* | (2006.01) |
| *B29C 65/36* | (2006.01) |
| *B29C 65/48* | (2006.01) |
| *B29C 65/50* | (2006.01) |
| *B29C 65/78* | (2006.01) |
| *B29C 65/00* | (2006.01) |
| *B29C 69/00* | (2006.01) |
| *B29C 53/02* | (2006.01) |
| *B29L 31/30* | (2006.01) |

(52) U.S. Cl.
CPC ........... *B29C 65/3612* (2013.01); *B29C 53/02* (2013.01); *B29C 65/4815* (2013.01); *B29C 65/4875* (2013.01); *B29C 65/5057* (2013.01); *B29C 65/7841* (2013.01); *B29C 66/1122* (2013.01); *B29C 66/301* (2013.01); *B29C 66/532* (2013.01); *B29C 66/7252* (2013.01); *B29C 66/7394* (2013.01); *B29C 66/73753* (2013.01); *B29C 66/81422* (2013.01); *B29C 66/81423* (2013.01); *B29C 69/00* (2013.01); *B60R 13/02* (2013.01); *B29C 65/7847* (2013.01); *B29L 2031/3041* (2013.01)

(58) Field of Classification Search
None
See application file for complete search history.

(56) References Cited

U.S. PATENT DOCUMENTS

| | | |
|---|---|---|
| 4,387,920 A | 6/1983 | Slaughter et al. |
| 4,504,534 A | 3/1985 | Adachi et al. |
| 4,978,562 A | 12/1990 | Wycech |

(Continued)

FOREIGN PATENT DOCUMENTS

EP     1 300 293 A1    4/2003

OTHER PUBLICATIONS

Eldridge, David. "DuPont shows auto composite impact beam at K preview" Plastics News, European Plastics News, Jun. 14, 2013.

(Continued)

*Primary Examiner* — Barbara J Musser
(74) *Attorney, Agent, or Firm* — John A. Miller; Miller IP Group, PLC

(57) ABSTRACT

A process for reinforcing a trim panel for a vehicle using one or more micro-truss reinforcement patches. Each micro-truss reinforcement patch is secured to an inner surface of a show surface panel of the trim panel while it is in a partially cured state and then fully cured. The micro-truss patch is fusion bonded to the panel.

12 Claims, 4 Drawing Sheets

(56) References Cited

U.S. PATENT DOCUMENTS

| | | | |
|---|---|---|---|
| 5,385,375 | A | 1/1995 | Morgan et al. |
| 5,804,511 | A | 9/1998 | Kelman et al. |
| 7,382,959 | B1 | 6/2008 | Jacobsen |
| 7,653,279 | B1 | 1/2010 | Jacobsen |
| 7,819,462 | B1 | 10/2010 | Owens |
| 2008/0048462 | A1 | 2/2008 | Zabik |
| 2012/0052247 | A1* | 3/2012 | Pook .................. B29C 65/5057 428/161 |
| 2013/0038076 | A1 | 2/2013 | Benvenuto et al. |
| 2013/0143060 | A1* | 6/2013 | Jacobsen ................ B29C 71/02 428/594 |

OTHER PUBLICATIONS

Strano, M. et al. "Non-Conventional Technologies for the Manufacturing of Anti-Intrusion Bars" 4 pgs.

* cited by examiner

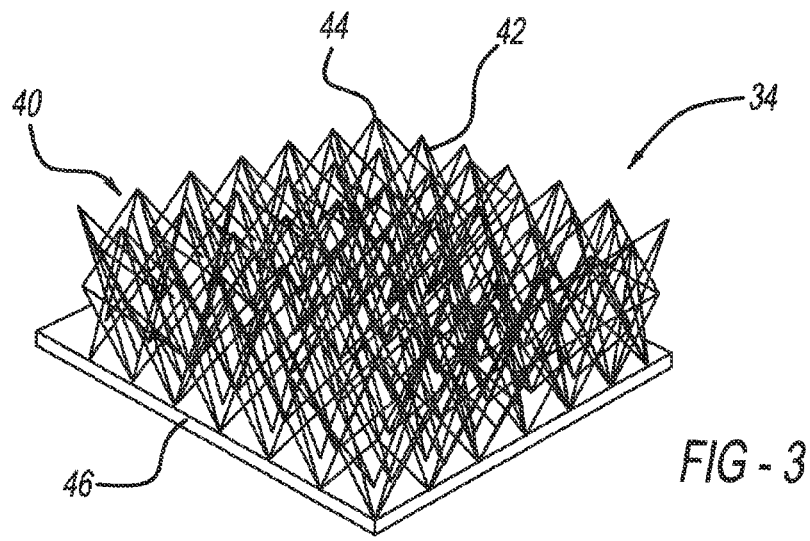
FIG-3
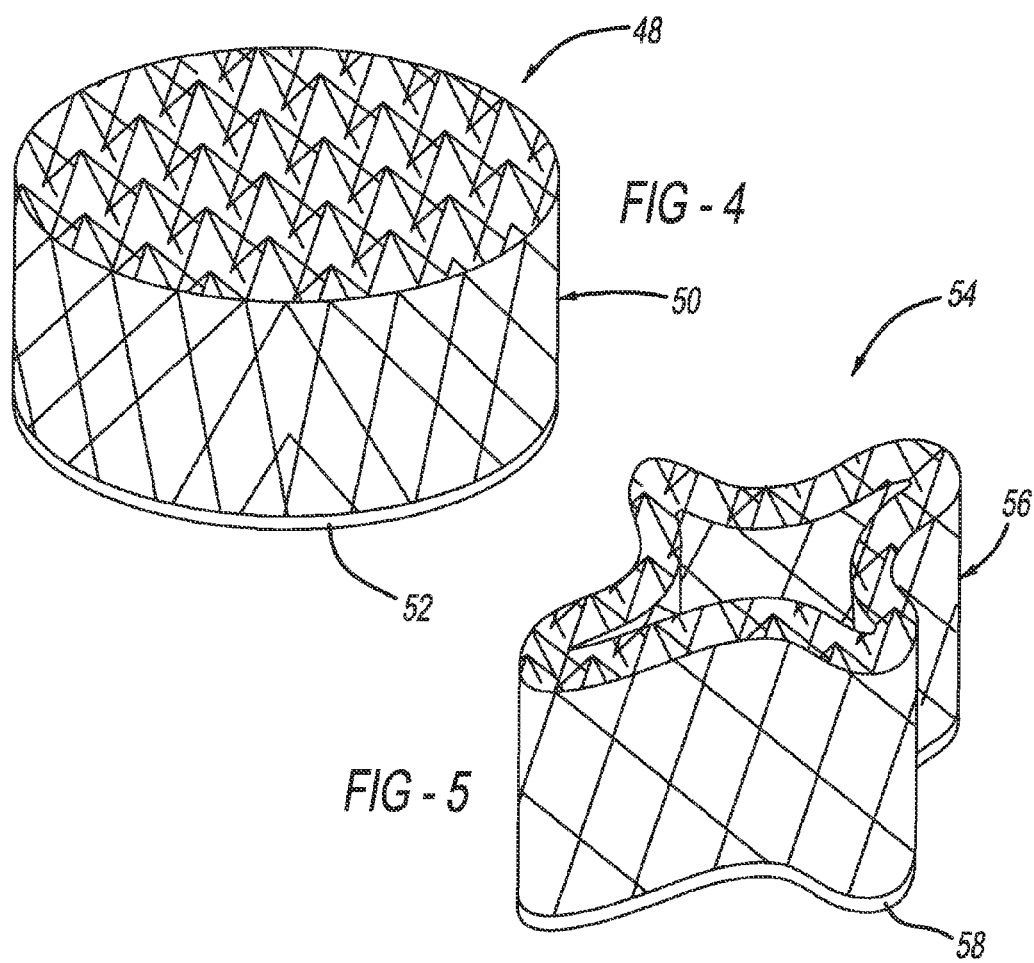
FIG-4
FIG-5

PROCESS FOR SECURING A MICRO-TRUSS STRUCTURE TO A PANEL

BACKGROUND OF THE INVENTION

Field of the Invention

This invention relates generally to a process for stiffening and/or strengthening thin panels and, more particularly, to a process for stiffening and/or strengthening trim panels for a vehicle that includes securing micro-truss reinforcement patches on an opposite surface of the trim panel from the show surface.

Discussion of the Related Art

Trim panels on a vehicle, such as fascias, rockers, door moldings, etc., often have an outward facing show surface, sometimes referred to as a class-A surface, that gives the panel an aesthetically pleasing appearance. Providing such show surfaces typically requires relatively expensive materials and manufacturing processes. Thus, trim panels are typically made very thin to conserve cost. However, such trim panels often times have a two-dimensional or three-dimensional curvature and are required to be stiff enough to resist various loads without excessive deformation. In response to this, it is known in the art to make a trim panel as a two-piece structure including an outer show surface panel and an internal support structure often including a series of stiffening ribs forming a frame that provides structural integrity. The support structure may include a series of welding pads integrated into the support structure at locations where the ribs cross. The welding pads have the general shape of the show surface panel and are used to ultrasonically weld the support structure to an inside surface of the show surface panel. The stiffness of the trim panel is set mainly by the height, thickness and spacing of the ribs.

In order to reduce cost and weight, it is desirable to limit the number of ribs in the support structure, which also reduces its stiffening capability. Thus, the ribs are generally selectively positioned and provided with different heights depending on where the structural integrity of the particular trim panel is desired. However, the height of the ribs is limited by the packaging volume of the trim panel. Further, although the show surface panel does possess some inherentstiffness, most of the stiffness is provided by the rib structure. Therefore, in order to further reduce the cost of the trim panel, it is desirable to make the show surface panel as thin as possible consistent with the ability of the support structure to provide the desired rigidity. However, because the support structure is welded to the show surface panel, there are limits as to how thin the show surface panel can be because the welding operation could cause imperfections on the show surface of the show surface panel if it is too thin.

It is known in the art to fabricate a three-dimensional micro-truss polymer structure for various structural uses. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. Light sources are positioned relative to the mask and light from the light sources shinning through the apertures cures and hardens interconnected polymer columns, referred to herein as struts, to form a rigid support structure. Once the columns are cured, the struts are formed and the light sources are turned off, the reservoir is emptied of the non-cured monomer that did not receive the light so that the resulting hard polymer structure forms the micro-truss structure having an array of spaced apart struts.

SUMMARY OF THE INVENTION

The following disclosure describes a process for reinforcing a trim panel for a vehicle using one or more micro-truss reinforcement patches. Each micro-truss reinforcement patch is secured to an inner surface of a show surface panel of the trim panel while it is in a partially cured state and then fully cured. The micro-truss patch is fusion bonded to the panel.

Additional features of the present invention will become apparent from the following description and appended claims, taken in conjunction with the accompanying drawings.

BRIEF DESCRIPTION OF THE DRAWINGS

FIG. 3 is an isometric view of one of the micro-truss reinforcement patches separated from the trim panel shown in FIG. 2;

FIG. 4 is an isometric view of another micro-truss reinforcement patch;

FIG. 5 is an isometric view of another micro-truss reinforcement patch;

DETAILED DESCRIPTION OF THE EMBODIMENTS

The following discussion of the embodiments of the invention directed to process for employing micro-truss structures to reinforce trim panels on a vehicle is merely exemplary in nature, and is in no way intended to limit the invention or its applications or uses. For example, the present invention has particular application for increasing the structural integrity of a vehicle trim panel. However, as well be appreciated by those skilled in the art, the technique of providing structural integrity to a thin panel can be provided for other applications.

Figure 1:
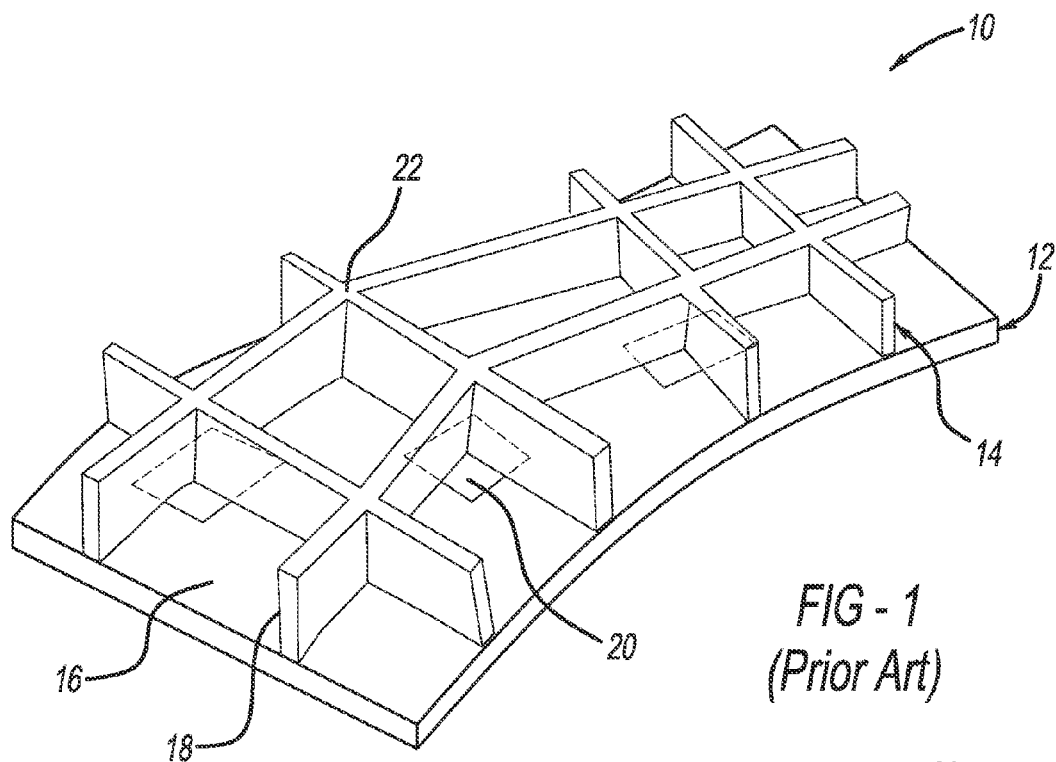
FIG. 1 is an isometric view of a known vehicle trim panel including a show surface panel and a support frame.

FIG. 1 is an isometric view of a known vehicle trim panel 10 including a show surface panel 12 and a rib support structure 14 of the type discussed above. The structure 14 is mounted to a backside surface 16 of the show surface panel 12 opposite to a show face of the panel 12. The structure 14 includes a series of crossing ribs 18 having a height, width and spacing determined by the desired structural integrity of the panel 10. A number of welding patches 20 are integrated into the structure 14 at intersection points 22 between crossing ribs 18 to provide a surface to secure the structure 14 to the surface 16. The panel 10 has a number of drawbacks as discussed above, including limits to the height of the structure 14 by the packaging volume of the panel 10 and the thickness of the show face panel 12 to allow welding thereto.

Figure 2:
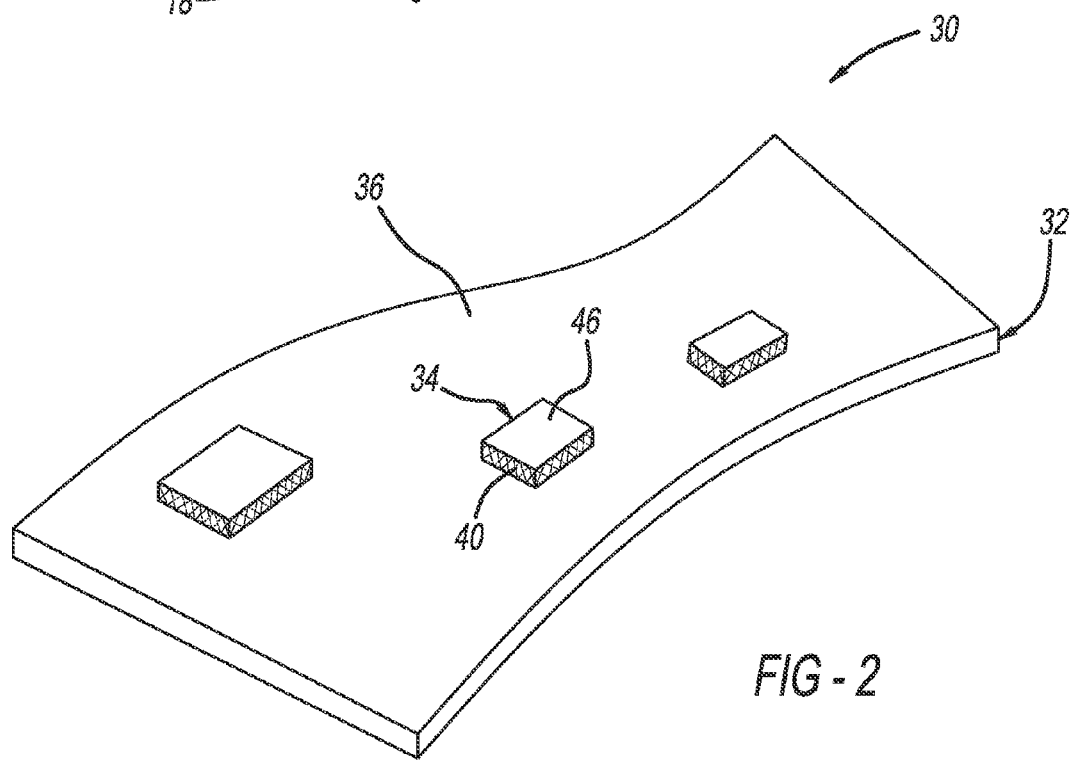
FIG. 2 is an isometric view of a trim panel for a vehicle including a show surface panel and a plurality of micro-truss reinforcement patches adhered to a back surface of the show surface panel.

FIG. 2 is an isometric view of a vehicle trim panel 30 including a show surface panel 32 similar to the show surface panel 12 discussed above. Instead of using the rib support structure 14 to reinforce the show surface panel 32, the present invention employs a number of micro-truss reinforcement patches 34 adhered to an inside surface 36 of the show surface panel 32 opposite to the show surface of the panel 32 to provide structural integrity for the panel 30, where the patches 34 include a micro-truss structure formed by the process referred to above.

FIG. 3 is an isometric view of one of the patches 34 separated from the panel 30. The patch 34 includes a micro-truss structure 40 defined by a plurality of interconnected polymer struts 42, where the structure 40 includes a number of separated nodes 44 at opposing bottom and top surfaces of the patch 34 where the struts 42 end. The nodes 44 on the top surface represent the initial impingement mask point of several light beams during the fabrication process of the micro-truss structure 40, where the struts 42 radiate out from the nodes 44 depending on the number of light sources and the position of the light sources. The configuration of the struts 42 for a particular application can be any configuration that is suitable for that application.

In this illustration, a thin support layer 46, such as aluminum, fiberglass, polymer, etc., is adhered to the top or bottom surface of the micro-truss structure 40, such as by gluing, to the nodes 44, or ends of the struts 42, at that surface or by forming a direct bond with this layer during the truss fabrication process. In one embodiment, the surface of the micro-truss structure 40 that does not include the layer 46 is adhered to the inside surface 36 of the show surface panel 32, for example, by adhesion or gluing. The number of the nodes 44, or ends of the struts 42, that are adhered to the surface 36 can be selectively engineered to reduce material and labor costs, where not all of the nodes 44 are required to be secured thereto. Particularly, the bonding can be distributed over an array of the nodes 44 with a small footprint instead of localizing it to large bond pads to reduce thermal distortions and thus allow a thinner gauge for the show face panel 32. The micro-truss structure 40 and its spatial variation can be optimized for the final shape of the panel after bonding. Any suitable technique can be employed to secure the patches 34 to the inside surface 36 of the panel 32. By employing the patches 34 in the manner discussed herein, the patches 34 provide distributed stiffening panels that are stronger and/or stiffer than the known rib reinforced panels.

The stiffness and strength of the patches 34 depends not only on the thickness of the panel 32, but also on the geometry of the particular patch 34. The geometry of the patch 34 can be tailored to optimize the panel stiffness, strength and mass. The reinforcement patches 34 can be formed in any desirable size or shape for a particular trim panel to provide the desired structural integrity for the particular application. For example, FIG. 4 is an isometric view of a round reinforcement patch 48 including a micro-truss structure 50 mounted to a layer 52 and FIG. 5 is an isometric view of a star-shaped reinforcement patch 54 including a micro-truss structure 56 mounted to a layer 58 that show other suitable alternatives.

The micro-truss structures being discussed herein can only be fabricated as a thermoset material, which gives it a higher modular strength, temperature resistance, chemical resistance, etc. than other plastic materials. Typically, the show surface panel for a vehicle trim panel will be a thermoplastic material to allow it to be easily molded using various molding operations, such as injection molding, although other materials, such as metal, fiberglass, carbon fiber, etc., can be employed. It may desirable to fusion weld the micro-truss structure to the inside surface of the show surface panel because fusion welding typically provides a higher strength than adhesive bonds and is also cheaper. However, thermoset materials cannot be readily melted, and thus cannot be fusion bonded. The present invention proposes various processes for fusion welding a thermoset micro-truss structure to a thermoplastic show surface panel.

Figure 6:
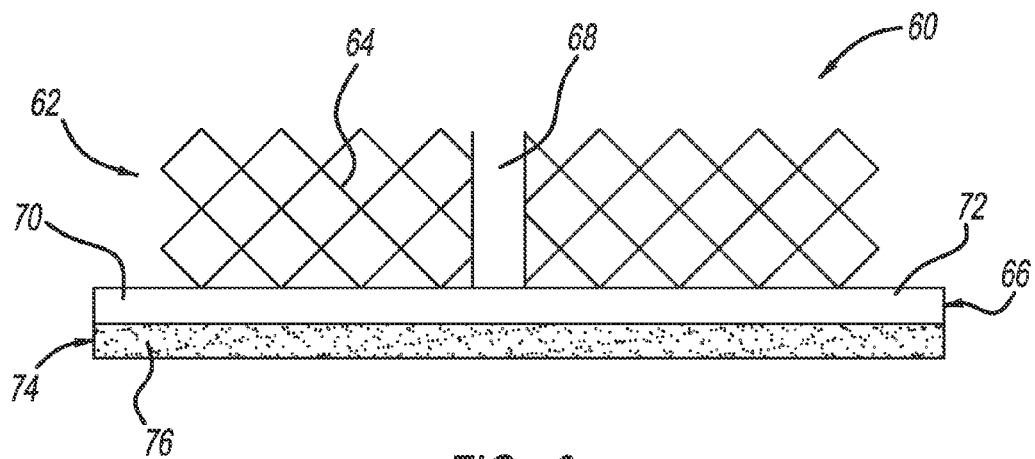
FIG. 6 is a side view of a partially cured micro-truss reinforcement patch formed on a flexible thermoplastic skin.

To illustrate this embodiment of the invention, FIG. 6 is a side view of a micro-truss reinforcement patch 60 including a micro-truss structure 62 defined by polymerized struts 64 in the manner discussed above that have been formed on a thin, flexible thermoplastic layer 66. During the fabrication process of the micro-truss structure 62, the intensity and duration of the light that polymerizes and cures the struts 64 is selected so that the struts 64 are only partially cured, such as 20-30% cured, so as to form a soft or malleable structure that allows the micro-truss structure 62 to be a single defined unit, but also allows it to be flexible. The micro-truss structure 62 is formed to include an open access point 68 in the micro-truss structure 62 and overhang tabs 70 and 72 at ends of the layer 66 for reasons that will become apparent from the discussion below. A fusion bonding layer 74 is deposited on a surface of the layer 66 opposite to the micro-truss structure 62 and secured thereto by any suitable process, such as by gluing or softening the layer base material. The fusion bonding layer 74 can include any suitable fusion bonding material or heatable material particles 76, such as induction bonding particles, eddy current particles, RF particles, etc. In an alternate embodiment, the layer 66 can be embedded with the heatable material particles 76 using any suitable embedding process. In this embodiment, the layer 66 is a thermoplastic material because the show surface panel 64 is a thermoplastic material, where fusion bonding requires the same or similar materials to provide the bonding. Alternately, if the trim panel is made of a different material, for example, carbon fiber, metal, etc., then the layer 66 would be made of that same material.

Figure 7:
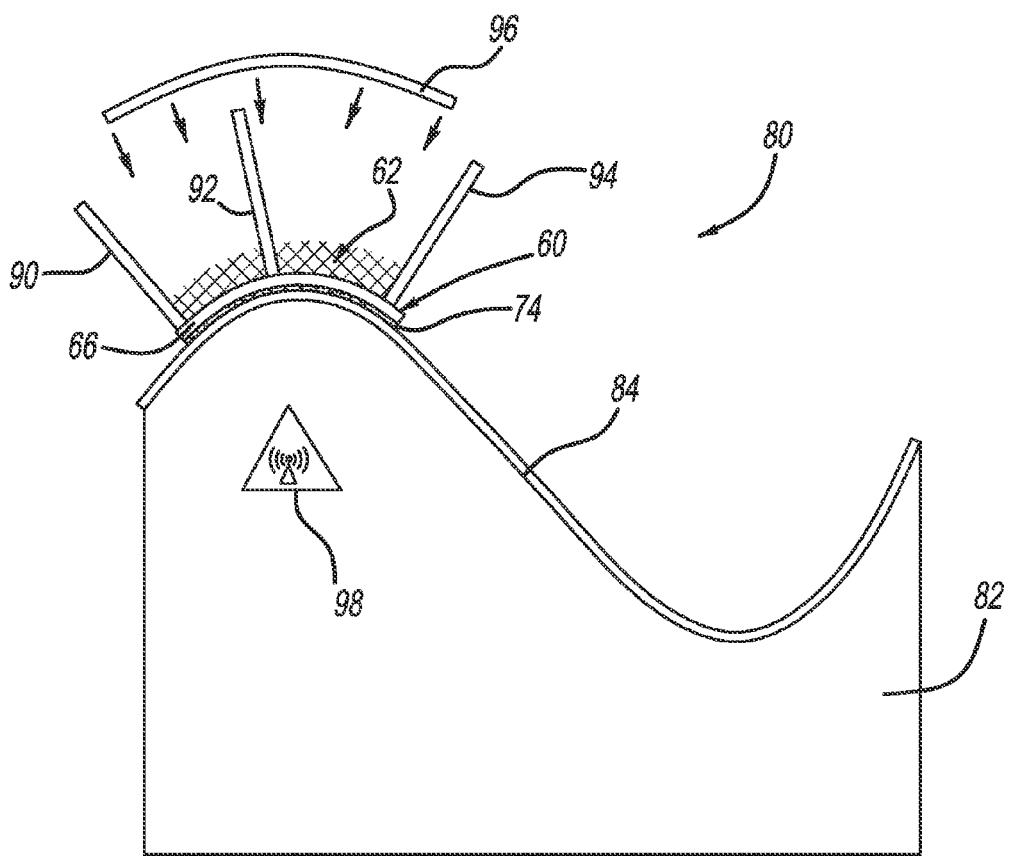
FIG. 7 is an illustration of the micro-truss reinforcement patch shown in FIG. 6 formed to a trim panel on a panel support.

Because the micro-truss structure 64 has not been completely cured and the layer 66 is thin and flexible, the structure 64 is easily bendable. FIG. 7 is an illustration 80 of a mold 82 on which is formed a show surface panel 84 for example, the panel 32, for a vehicle trim panel. The mold 82 can be a half mold where the panel 84 is molded between it and another half mold (not shown), or in an alternate embodiment, the panel 84 can be held to the mold 82 by pressure, such as air pressure. A coupling device including articulating appendages 90, 92 and 94 picks up the patch 60 while it is in the unflexed, but soft, state shown in FIG. 6 at the access point 68 and the overhang tabs 70 and 72, and then bends the patch 60 to conform to the shape of the panel 84 at the particular location where it will be attached thereto. The articulating appendages 90, 92 and 94 can use vacuum pressure to pick up and bend the patch 60, and can be any suitable device, such as a set of clamps, digits of a robotic end-effector, etc., to perform this process. While being held in this position, the micro-truss structure 62 is then completely cured by, for example, a UV light source 96 to harden the structure 62. Simultaneously or afterwards, an RF energy source 98, or other suitable device, is employed to heat the layer 74 and melt the bonding particles 76 to provide fusion bonding of the patch 60 to the panel 84. As mentioned, the bonding particles 76 can be induction bonding particles, eddy current particles, and RF particles. However, it is noted that this is for manufacturing convenience only, where other fusion welding operations can be employed, for example, conduction, radiation, convection heaters located in a trim support area.

Once the patch 60 is secured to the panel 84 as discussed above, it may be desirable to bond another flexible layer (not shown) opposite to the layer 66 to increase panel stiffness. It is noted that although the bonding layer 74 is shown to be continuously formed on the surface of the layer 66, in alternate embodiments, it may only need to be formed at certain locations depending on the desired joint strength. It is also noted that it may be possible to thermally cure the micro-truss structure 64 and perform the fusion welding of the thermoplastic layer 66 to the panel 84 in a single operation. For this, the micro-truss material, the thermoplastic material and the process parameters need to be carefully selected without compromising the finished part integrity.

Figure 8:
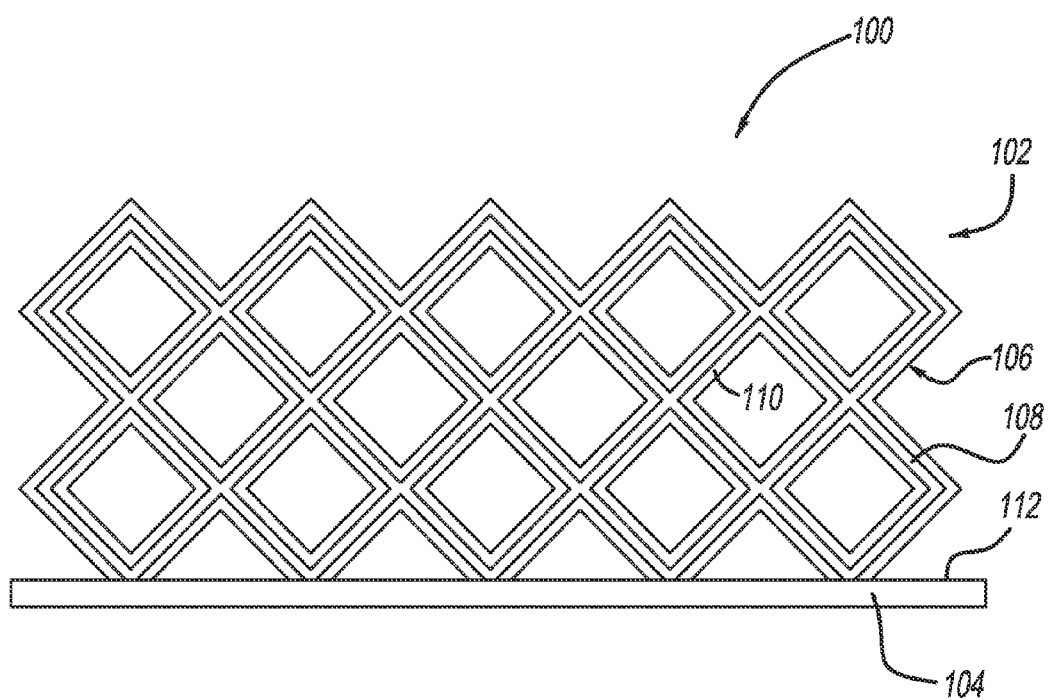
FIG. 8 is a side view of a thermoset micro-truss structure coated with a thermoplastic material.

In an alternate embodiment, the partially cured micro-truss structure can be coated with a thermoplastic coating that allows it to be fusion bonded to a thermoplastic show surface panel. This embodiment is illustrated in FIG. 8 showing a side view of a trim panel 100 including a micro-truss reinforcement structure 102 secured to an inside surface 112 of a show surface panel 104. Although this view depicts all of the show surface panel 104 as including the reinforcement structure 102, it is noted that the micro-truss reinforcement structure 102 can be a patch of the type discussed above having a particular shape and location on the panel 104 where reinforcement is required. The micro-truss structure 102 includes a series of struts 106 provided in any suitable configuration, where the struts 106 include a core 108 of the thermoset material that has been formed by the micro-truss fabrication process referred to above and an outer coating 110 of a thermoplastic material that is later put on the core 108 to provide a material that is applicable to be fusion bonded to the thermoplastic show surface panel 104.

The coating 110 can be deposited on the core 108 by any suitable fabrication process. In one embodiment, the partially cured micro-truss structure 102 is dipped in a thermoplastic material to provide the coating 110 on the core 108, where multiple dips of the micro-truss structure 102 can be performed to build up the coating 110 to a suitable thickness for the desired application. In this embodiment, the thermoplastic coating 104 is deposited on the micro-truss structure 102 when it is partially cured. The degree of cure of the micro-truss structure 102 is controlled so that it has the desired stiffness to withstand the light pressure applied during conforming the reinforcement patch to the panel 104 and fusion welding without excessive deformation and without making the structure 102 to stiff to conform to the corresponding location on the panel 104. Once the micro-truss structure 102 is placed on the panel 104, it is fusion welded thereto, and then the micro-truss structure 102 is completely cured to obtain the final structural strength. If the particular region to which the patch is being secured to the panel 104 has little or no curvature, the micro-truss structure 102 can be fully cured before the core 108 is covered with the coating 110.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for securing a reinforcement patch to a panel, said method comprising:
providing a partially cured micro-truss structure including an array of struts bonded to a flexible support layer;
providing a heatable material in association with the support layer;
shaping the partially cured micro-truss structure to the panel;
fully curing the micro-truss structure while it is shaped to the panel; and
fusion bonding the micro-truss structure to the panel using the heatable material.

2. The method according to claim 1 wherein providing the heatable material includes providing the heatable material as a layer applied to a surface of the support layer opposite to the micro-truss structure.

3. The method according to claim 1 wherein providing the heatable material includes embedding heatable material particles within the support layer.

4. The method according to claim 1 wherein providing a heatable material includes providing a heatable material selected from the group consisting of an induction heatable material, an eddy current heatable material and an RF heatable material.

5. The method according to claim 1 wherein providing a partially cured micro-truss structure includes providing access locations through and adjacent to the micro-truss structure that allow access to the support layer.

6. The method according to claim 5 wherein shaping the micro-truss structure to the panel includes using a coupling device to grasp the micro-truss structure through the access locations.

7. The method according to claim 6 wherein shaping the micro-truss structure to the panel includes bending, twisting or stretching the micro-truss structure to conform to the shape of the panel using the coupling device.

8. The method according to claim 1 wherein fully curing the micro-truss structure includes using an ultraviolet light source.

9. The method according to claim 1 wherein fusion bonding the micro-truss structure to the panel includes using an RF energy source.

10. The method according to claim 1 wherein fully curing the micro-truss structure and fusion bonding the micro-truss structure are performed simultaneously.

11. The method according to claim 1 wherein the panel is a vehicle trim panel.

12. The method according to claim 1 wherein the micro-truss structure is a thermoset structure.

* * * * *